United States Patent
Cao et al.

(10) Patent No.: US 12,165,603 B2
(45) Date of Patent: Dec. 10, 2024

(54) METHOD AND APPARATUS FOR BACKLIGHT CONTROL AND DISPLAY DEVICE

(71) Applicants: HAINING ESWIN COMPUTING TECHNOLOGY CO., LTD., Haining (CN); Beijing ESWIN Computing Technology Co., Ltd., Beijing (CN)

(72) Inventors: Wenjing Cao, Beijing (CN); Qiqiang Han, Beijing (CN); Bo Zhao, Beijing (CN)

(73) Assignees: HAINING ESWIN COMPUTING TECHNOLOGY CO., LTD., Haining (CN); BEIJING ESWIN COMPUTING TECHONOLOGY CO., LTD., Beijing (CN)

( * ) Notice: Subject to any disclaimer, the term of this patent is extended or adjusted under 35 U.S.C. 154(b) by 13 days.

(21) Appl. No.: 18/091,575

(22) Filed: Dec. 30, 2022

(65) Prior Publication Data
US 2023/0215392 A1    Jul. 6, 2023

(30) Foreign Application Priority Data
Dec. 31, 2021 (CN) .......................... 202111657184.5

(51) Int. Cl.
*G09G 3/34* (2006.01)
*G02F 1/13357* (2006.01)

(52) U.S. Cl.
CPC ..... *G09G 3/3406* (2013.01); *G02F 1/133602* (2013.01); *G09G 2320/0233* (2013.01);
(Continued)

(58) Field of Classification Search
CPC ......... G09G 3/3406; G09G 2320/0233; G09G 2320/06
See application file for complete search history.

(56) References Cited

U.S. PATENT DOCUMENTS 5,317,397 A * 5/1994 Odaka .................... H04N 19/16
375/E7.193
8,358,293 B2 * 1/2013 Seo ....................... G09G 3/3426
345/204
(Continued)

FOREIGN PATENT DOCUMENTS

CN        101086573 A      12/2007
CN        102324222 A       1/2012
(Continued)

OTHER PUBLICATIONS

Office Action, including Search Report, for Chinese Patent Application No. 202111657184.5, dated Feb. 7, 2023, 26 pages.

*Primary Examiner* — Benyam Ketema
(74) *Attorney, Agent, or Firm* — Westman, Champlin & Koehler, P.A.

(57) ABSTRACT

Disclosed is a method and an apparatus for backlight control and a display device. The apparatus comprises: a block brightness module for calculating an initial brightness value of each backlight block in a backlight source according to initial image data; a filtering module for performing spatial filtering and temporal filtering on the initial brightness value of each backlight block to obtain an adjusted brightness value of each backlight block; a control module for generating a brightness control signal according to the adjusted brightness value of each backlight block to adjust brightness of the backlight source. An intermediate brightness value of each backlight block is no less than the initial brightness value of that backlight block. Based on backlight adjustment for reducing power consumption, display effect reduction on a portion of image due to uneven brightness of the portion of the image during the spatial filtering is avoided.

12 Claims, 4 Drawing Sheets

(52) U.S. Cl.
CPC .................. *G09G 2320/06* (2013.01); *G09G 2330/021* (2013.01); *G09G 2360/16* (2013.01)

(56) References Cited

U.S. PATENT DOCUMENTS

| | | | | |
|---|---|---|---|---|
| 8,493,313 | B2* | 7/2013 | Damberg | G09G 3/3426 |
| | | | | 345/694 |
| 9,064,459 | B2* | 6/2015 | Ha | G09G 3/3406 |
| 9,222,629 | B2* | 12/2015 | Ninan | G02B 30/24 |
| 9,390,681 | B2* | 7/2016 | Barnhoefer | G09G 5/10 |
| 9,595,229 | B2 | 3/2017 | Cho et al. | |
| 2007/0285379 | A1* | 12/2007 | Jung | G09G 3/3611 |
| | | | | 345/102 |
| 2008/0042927 | A1* | 2/2008 | Jung | G09G 3/3426 |
| | | | | 345/39 |
| 2009/0002400 | A1* | 1/2009 | Ha | G09G 3/3607 |
| | | | | 345/102 |
| 2009/0015917 | A1* | 1/2009 | Iwamoto | G02B 30/56 |
| | | | | 359/462 |
| 2009/0102781 | A1* | 4/2009 | Chien | G09G 3/3406 |
| | | | | 345/102 |
| 2009/0201320 | A1* | 8/2009 | Damberg | G09G 3/3426 |
| | | | | 345/694 |
| 2011/0057961 | A1* | 3/2011 | Tsuru | G09G 3/342 |
| | | | | 345/89 |
| 2011/0141154 | A1* | 6/2011 | Ahn | G09G 3/3426 |
| | | | | 345/102 |
| 2011/0169852 | A1* | 7/2011 | Yu | G09G 3/342 |
| | | | | 345/589 |
| 2012/0133685 | A1* | 5/2012 | Cho | G09G 3/3426 |
| | | | | 345/102 |
| 2013/0016141 | A1* | 1/2013 | Chang | G09G 3/3611 |
| | | | | 345/694 |
| 2013/0155125 | A1* | 6/2013 | Inamura | G09G 3/3426 |
| | | | | 345/102 |
| 2015/0262534 | A1* | 9/2015 | Ha | G09G 3/3406 |
| | | | | 345/102 |
| 2018/0182306 | A1* | 6/2018 | Seong | G09G 3/36 |

FOREIGN PATENT DOCUMENTS

| | | |
|---|---|---|
| CN | 102479496 A | 5/2012 |
| CN | 107689214 A | 2/2018 |
| CN | 107978282 A | 5/2018 |
| CN | 110992898 A | 4/2020 |
| CN | 111833822 A | 10/2020 |
| CN | 114420055 A | 4/2022 |

* cited by examiner

METHOD AND APPARATUS FOR BACKLIGHT CONTROL AND DISPLAY DEVICE

CROSS-REFERENCE TO RELATED APPLICATIONS

The present application claims priority to Chinese Patent Application No. 202111657184.5, filed on Dec. 31, 2021, entitled by "METHOD AND APPARATUS FOR BACKLIGHT CONTROL AND DISPLAY DEVICE", and published as CN114420059A on Apr. 29, 2022, which is incorporated herein by reference in its entirety.

TECHNICAL FIELD

The present disclosure relates to a technical field of display control, in particular to a method and an apparatus for backlight control and a display device.

BACKGROUND

A liquid crystal display device, belonging to non-autonomous light-emitting display devices, can provide a light source to a display panel by using a backlight source, and realize image display by turning over liquid crystal particles in the display panel.

The backlight source in the liquid crystal display device in the prior art has constant brightness. When grayscale values of an input image are zero, the display panel will still have a certain light transmittance even under a full-off state, and then light leakage of liquid crystal will occur, which will increase the brightness of dark content of a display image, resulting in poor display effect and high power consumption.

SUMMARY

To solve the above technical problems, the present disclosure provides a method and an apparatus for backlight control and a display device, to reduce power consumption and improve display effect.

According to a first aspect of the present disclosure, an apparatus for backlight control is provided, and comprises:

a block brightness module, configured to calculate an initial brightness value of each of backlight blocks in a backlight source according to initial image data;

a filtering module, connected to the block brightness module and configured to perform spatial filtering processing and temporal filtering processing on the initial brightness value of each of the backlight blocks to obtain an adjusted brightness value of each of the backlight blocks; and a control module, connected to the filtering module and configured to generate a brightness control signal according to the adjusted brightness value of each of the backlight blocks to control a backlight source drive circuit to adjust brightness of the backlight source, wherein an intermediate brightness value of each of the backlight blocks obtained after the filtering module performs the spatial filtering processing on the initial brightness value of that backlight block is greater than or equal to the initial brightness value of that backlight block.

Optionally, the filtering module comprises:

a spatial filtering unit, configured to perform Gaussian filtering processing on the initial brightness values of backlight blocks positioned around each of the backlight blocks to obtain a filtered brightness value of that backlight block, and to take a larger one of the initial brightness value and the filtered brightness value of that backlight block as the intermediate brightness value of that backlight block.

Optionally, the filtering module further comprises:

a temporal filtering unit, configured to obtain the adjusted brightness value of each of the backlight blocks according to the intermediate brightness value of that backlight block in a current frame, the adjusted brightness value of that backlight block in a previous frame, and a smoothness parameter, wherein the smoothness parameter is related to a first threshold value, a second threshold value, and a mean absolute difference value of the intermediate brightness values of each of the backlight blocks in images of adjacent frames.

Optionally, the apparatus for backlight control further comprises:

a pixel brightness module, connected to the filtering module and configured to calculate an adjusted brightness value of a pixel in each of the backlight blocks according to the adjusted brightness value of each of the backlight blocks; and a compensation module, connected to the pixel brightness module and configured to obtain compensated image data according to the initial image data, the adjusted brightness value of the pixel, and an initial brightness value of the pixel, wherein the compensated image data matches with the adjusted brightness value of the pixel.

Optionally, the pixel brightness module comprises:

a photographing unit, configured to obtain light diffusion data of the backlight source;

a sampling unit, configured to downsample the light diffusion data to generate downsampled data;

a storage unit, connected to the sampling unit and configured to store the downsampled data; and a first calculation unit, connected to the storage unit and the filtering module, respectively, and configured to upsample the downsampled data being stored to generate upsampled data, and to perform convolution operation on the upsampled data with the adjusted brightness value of each of the backlight blocks of the backlight source, so as to obtain the adjusted brightness value of the pixel in each of the backlight blocks.

Optionally, the block brightness module comprises:

a block region analysis unit, configured to divide an initial image into a plurality of non-overlapped block regions corresponding to the backlight blocks of the backlight source, respectively;

a second calculation unit, configured to calculate a grayscale value of each pixel in each of the plurality of block regions, to mark a maximum grayscale value of each of the plurality of block regions, and to calculate an average grayscale value of each of the plurality of block regions, wherein the grayscale value of each pixel is a maximum grayscale value of subpixels in that pixel; and a third calculation unit, configured to obtain a grayscale value of each of the plurality of block regions according to the maximum grayscale value of each of the plurality of block regions, the average grayscale value of each of the plurality of block regions, and a balance parameter, and to obtain the initial brightness value of each of the backlight blocks corresponding to a corresponding one of the plurality of block regions according to the grayscale value of the corresponding one of the plurality of block regions.

According to a second aspect of the present disclosure, a method for backlight control is provided, and comprises:

calculating an initial brightness value of each of the backlight blocks in a backlight source according to initial image data;

performing spatial filtering processing and temporal filtering processing on the initial brightness value of each of the backlight blocks to obtain an adjusted brightness value of each of the backlight blocks; and generating a brightness control signal according to the adjusted brightness value of each of the backlight blocks, so as to adjust brightness of the backlight source, wherein an intermediate brightness value of each of the backlight blocks obtained after the spatial filtering processing is performed on the initial brightness value of that backlight block is greater than or equal to the initial brightness value of that backlight block.

Optionally, the step of performing spatial filtering processing on the initial brightness value of each of the backlight blocks comprises:

performing Gaussian filtering processing on the initial brightness values of backlight blocks positioned around each of the backlight blocks to obtain a filtered brightness value of that backlight block; and taking a larger one of the initial brightness value and the filtered brightness value of each of the backlight blocks as the intermediate brightness value of that backlight block.

Optionally, the step of performing temporal filtering processing on the initial brightness value of each of the backlight blocks comprises:

obtaining the adjusted brightness value of that backlight block according to the intermediate brightness value of that backlight block in a current frame, the adjusted brightness value of that backlight block in a previous frame, and a smoothness parameter, wherein the smoothness parameter is related to a first threshold value, a second threshold value, and a mean absolute difference value of the intermediate brightness values of each of the backlight blocks in images of adjacent frames.

Optionally, the method for backlight control further comprises:

calculating an adjusted brightness value of a pixel in each of the backlight blocks according to the adjusted brightness value of each of the backlight blocks; and obtaining compensated image data according to the initial image data, the adjusted brightness value of the pixel, and an initial brightness value of the pixel, wherein the compensated image data matches with the adjusted brightness value of the pixel.

Optionally, the step of calculating an adjusted brightness value of a pixel in each of the backlight blocks according to the adjusted brightness value of each of the backlight blocks comprises:

obtaining light diffusion data of the backlight source;

downsampling the light diffusion data to generate downsampled data;

storing the downsampled data; and upsampling the downsampled data being stored to generate upsampled data, and performing convolution operation on the upsampled data with the adjusted brightness value of each of the backlight blocks of the backlight source, so as to obtain the adjusted brightness value of the pixel in each of the backlight blocks.

According to a third aspect of the present disclosure, a display device is provided and comprises:

a display panel;

a backlight source, configured to provide a light source for the display panel;

a backlight source drive circuit, configured to drive the backlight source; and the apparatus for backlight control according to embodiments of the present disclosure.

The apparatus for backlight control provided by the present disclosure is configured to generate a backlight control signal according to input initial image data, and control the backlight source drive circuit by the backlight control signal to reduce the brightness of the backlight source, thereby improving display effect and reducing power consumption. Moreover, in a backlight control mode of the present disclosure, an intermediate brightness value of a backlight block obtained after the spatial filtering processing is performed on the initial brightness value of the backlight block is greater than or equal to the initial brightness value of the backlight block, such that reduction of display effect of a portion of an image due to uneven brightness of the portion of the image during the spatial filtering processing may be avoided, on the basis of reducing power consumption by adjusting backlight.

It should be noted that the general description above and the detailed description below are only exemplary and explanatory, and cannot limit the present disclosure.

DETAILED DESCRIPTION OF THE EMBODIMENTS

For the convenience of understanding the present disclosure, the present disclosure will be more comprehensively described below with reference to the relevant accompanying drawings. The preferred embodiments of the present disclosure are shown in the accompanying drawings. However, the present disclosure may be implemented in different forms, and is not limited to the embodiments described herein. On the contrary, the objective of providing these embodiments is to make a more thorough and comprehensive understanding of the content provided by the present disclosure.

In general, a liquid crystal display device at least comprises a main control circuit, a display drive circuit, a backlight source drive circuit, a display panel, and a backlight source. Herein, the display panel comprises a pixel array, data lines and scan lines connected to the pixel array. The display drive circuit is configured to drive one of the data lines and one of the scan lines to write initial image data into a corresponding pixel. The backlight source is configured to provide a light source to the corresponding pixel, and the backlight source drive circuit is configured to drive the backlight source to provide the light source. Herein, the backlight source may be, for example, integrated in the display panel.

An apparatus for backlight control is provided in the present disclosure, such that a backlight control signal is generated according to input initial image data by means of a backlight control technology, and the backlight source drive circuit is controlled by the backlight control signal to reduce brightness of the backlight source, thereby improving display effect and reducing power consumption. Further, the apparatus for backlight control provided by the present disclosure also compensates the initial image data according to the adjusted brightness of the backlight source to obtain compensated image data matching with the adjusted brightness of the backlight source, thereby keeping the brightness of a display image unchanged after grayscale compensation, and improving the contrast.

In following descriptions, a direct type backlight source, of which the backlight brightness is under control, is taken as an example.

Figure 1:
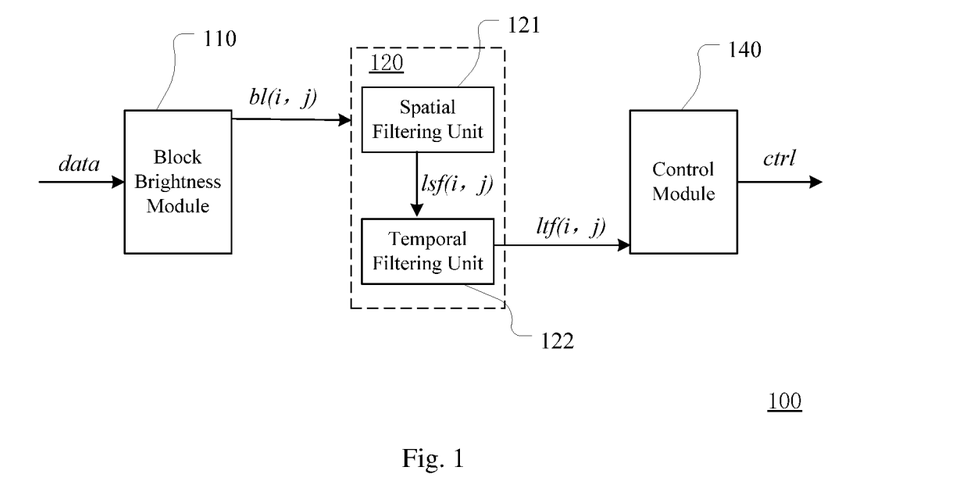
FIG. 1 shows a schematic structural diagram of an apparatus for backlight control provided according to a first embodiment of the present disclosure.

FIG. 1 shows a schematic structural diagram of an apparatus for backlight control provided according to a first embodiment of the present disclosure. Referring to FIG. 1, the apparatus 100 for backlight control comprises a block brightness module 110, a filtering module 120, and a control module 140. The block brightness module 110 calculates an initial brightness value $bl(i, j)$ of each backlight block in a backlight source according to initial image data (data). The filtering module 120 is connected to the block brightness module 110 to receive the initial brightness value $bl(i, j)$ of each backlight block, and is configured to perform spatial filtering processing and temporal filtering processing on the initial brightness value $bl(i, j)$ of each backlight block, so as to obtain an adjusted brightness value $ltf(i, j)$ of each backlight block. The control module 140 is connected to the filtering module 120 and is configured to generate a brightness control signal ctrl according to the adjusted brightness value $ltf(i, j)$ of each backlight block to control a backlight source drive circuit to adjust the brightness of the backlight source. Further, an intermediate brightness value $lsf(i, j)$ of the backlight block obtained after the filtering module 120 performs the spatial filtering processing on the initial brightness value $bl(i, j)$ of each backlight block is greater than or equal to the initial brightness value $bl(i, j)$ of that backlight block. On the basis of reducing the power consumption by adjusting backlight, reduction of display effect of a portion of an image due to uneven brightness of the portion of the image during the spatial filtering processing may be avoided. Herein, the backlight source comprises m*n non-overlapped backlight blocks. Further, for example, the backlight source is evenly divided into m*n backlight blocks, where $0 \leq i < m$, and $0 \leq j < n$.

Figure 5:
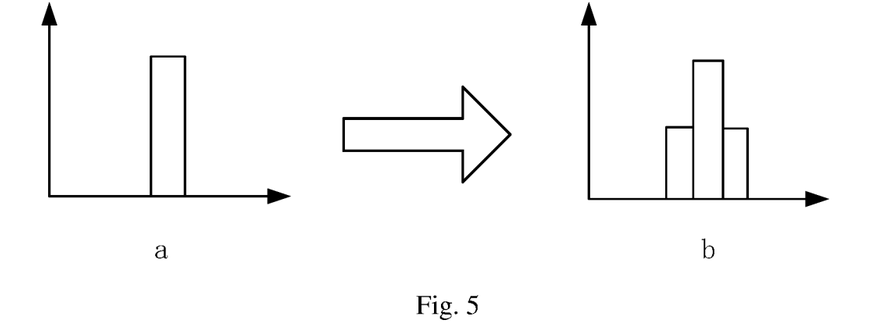
FIG. 5 shows a schematic waveform diagram of a spatial filtering unit of a filtering module in the apparatus for backlight control provided according to the present disclosure.

Further, the filtering module 120 comprises a spatial filtering unit 121 and a temporal filtering unit 122. The spatial filtering unit 121 is configured to perform Gaussian filtering processing on the initial brightness values $bl(i, j)$ of the backlight blocks positioned around each backlight block to obtain a filtered brightness value of that backlight block, and to take a larger one of the initial brightness value $bl(i, j)$ and the filtered brightness value of that backlight block as the intermediate brightness value $lsf(i, j)$ of that backlight block. Furthermore, the spatial filtering unit 121 is, for example, selected from a non-linear low-pass filter, and the intermediate brightness value, which can be expressed by $lsf(i,j)=\max(bl(i,j), \Sigma_{p=0}^{f-1}\Sigma_{q=0}^{f-1} sf(p,q)*bl(p,q))$, of the backlight block is obtained via processing of the non-linear low-pass filter, where $\Sigma_{p=0}^{f-1}\Sigma_{q=0}^{f-1} sf(p,q)*bl(p,q)$ is a filtered backlight value of that backlight block, and $sf(\cdot)$ is a Gaussian filter of f*f. Specifically, the filtered brightness value of each backlight block refers to a sum obtained after the backlight blocks positioned around that backlight block are respectively subjected to the Gaussian filtering. In this embodiment, f is set to be equal to 7, and the backlight blocks positioned around a backlight block may comprise a group of 7*7 backlight blocks centered on that backlight block. It should be noted that when a backlight block positioned in an edge region cannot obtain a group of 7*7 backlight blocks centered on that backlight block, a missing backlight block in the group of backlight blocks can be substituted with another backlight block having a mirror image positional relationship therewith. The intermediate brightness value $lsf(i,j)$ of each backlight block is selected from the larger one of the initial brightness value $bl(i, j)$ and the filtered brightness value of that backlight block. Herein, FIG. 5 shows a schematic waveform diagram of the spatial filtering unit of the filtering module in the apparatus for backlight control provided according to the present disclosure. Referring to FIG. 5, "a" represents a distribution of the initial brightness values of a part of the backlight blocks before the spatial filtering. In this portion of the image, there is a backlight block with high brightness in a region where surrounding backlight is 0. "b" represents a distribution of the intermediate brightness values of the part of the above backlight blocks after the spatial filtering. Compared to before the spatial filtering, the brightness value of any one of the backlight blocks is not reduced, and uneven artifacts (halo) may be reduced through the spatial filtering processing according to the present disclosure.

Further, the temporal filtering unit 122 is configured to obtain the adjusted brightness value $ltf(i, j)$ of each backlight block according to the intermediate brightness value $lsf(i, j)$ of that backlight block in a current frame, the adjusted brightness value of that backlight block in a previous frame, and a smoothness parameter R, wherein the smoothness parameter R is related to a first threshold value th1, a second threshold value th2, and a mean absolute difference value msd of the intermediate brightness values of each backlight block in images of adjacent frames. Furthermore, the temporal filtering unit 122 is selected from, for example, an infinite impulse response (IIR) filter which is self-adaptive according to a scene, and the adjusted brightness value, which can be expressed by $ltf^{(k)}(i,j)=R \cdot lsf^{(k)}(i,j)+(1-R) \cdot ltf^{(k-1)}(i,j)$, of each backlight block is obtained via processing of the IIR filter, where $ltf^{(k)}(i,j)$ represents the intermediate brightness value of that backlight block in the current frame, and $ltf^{(k-1)}(i,j)$ represents the adjusted brightness value of that backlight block in a previous frame. The smaller the smoothness parameter R is, the smoother the IIR filter is, and the less easily the flicker artifacts can be detected. However, if the smoothness parameter R is too small, the change of the backlight brightness of the backlight source will delay when an image signal changes, and it is more serious especially when a scene changes suddenly. Further, in this embodiment, $R=\text{clip}(r \cdot msd, th1, th2), r<1$, the first threshold value $th1<1$, the second threshold value $th2<1$, and between images of adjacent frames, the mean absolute difference value of the intermediate brightness values of the backlight blocks is $$msd = \frac{1}{M*N} \sum_{i=0}^{M-1} \sum_{j=0}^{N-1} |lsf^{(k)}(i,j) - lsf^{(k-1)}(i,j)|,$$

where $lsf^{(k-1)}(i,j)$ represents the intermediate brightness value of each backlight block in the current frame, r·msd represents that the smoothness parameter R has a linear relationship with the mean absolute difference value msd of the intermediate brightness values of the backlight blocks in images of adjacent frames, and the mean absolute difference value msd of the intermediate brightness values of the backlight blocks in images of adjacent frames is mapped into a range 0 to 1 of the smoothness parameter R. Through the temporal filtering processing in the present disclosure, the backlight brightness of the backlight source may be controlled to change rapidly when a scene changes significantly, otherwise, the backlight brightness of the backlight source is controlled to change smoothly and gradually to avoid the flicker artifacts of the backlight.

Figure 2:
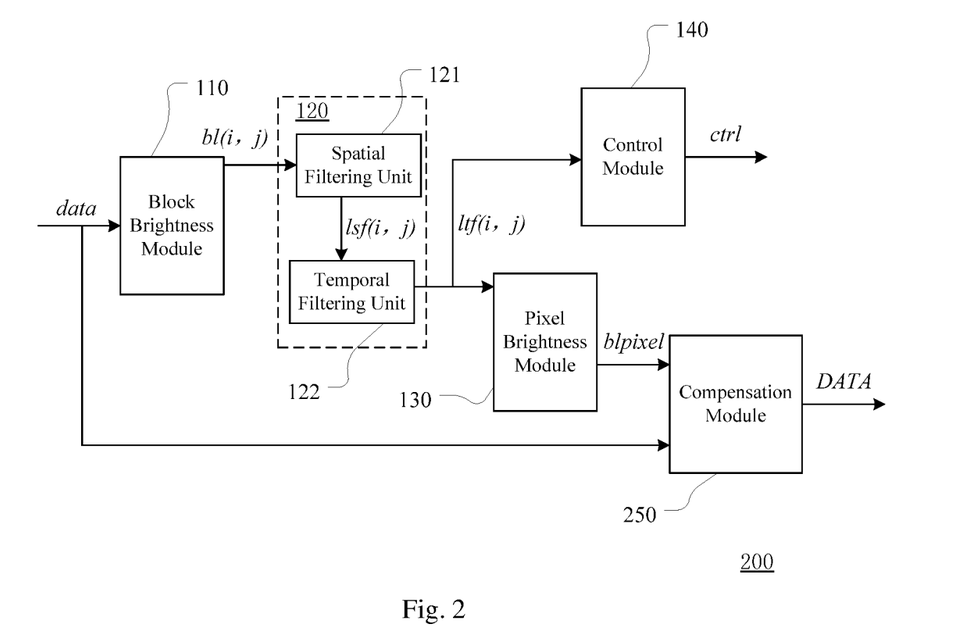
FIG. 2 shows a schematic structural diagram of an apparatus for backlight control provided according to a second embodiment of the present disclosure.

FIG. 2 shows a schematic structural diagram of an apparatus for backlight control provided according to a second embodiment of the present disclosure.

Referring to FIG. 2, the apparatus 200 for backlight control is additionally provided with a pixel brightness module 130 and a compensation module 250 according to the apparatus 100 for backlight control. Therefore, related content of the modules in the apparatus 200 for backlight control which are same as those in the apparatus 100 for backlight control will not be repeated here.

The pixel brightness module 130 is connected to the filtering module 120 and is configured to calculate an adjusted brightness value blpixel of a pixel in each backlight block according to the adjusted brightness value ltf(i, j) of that backlight block.

The compensation module 250 is connected to the pixel brightness module 130 and is configured to obtain compensated image data DATA according to the initial image data (data), the adjusted brightness value blpixel of the pixel, and an initial brightness value BLpixel of the pixel, wherein the compensated image data DATA matches with the adjusted brightness value blpixel of the pixel, and the initial brightness value BLpixel of the pixel is, for example, a maximum backlight brightness value.

Figure 3:
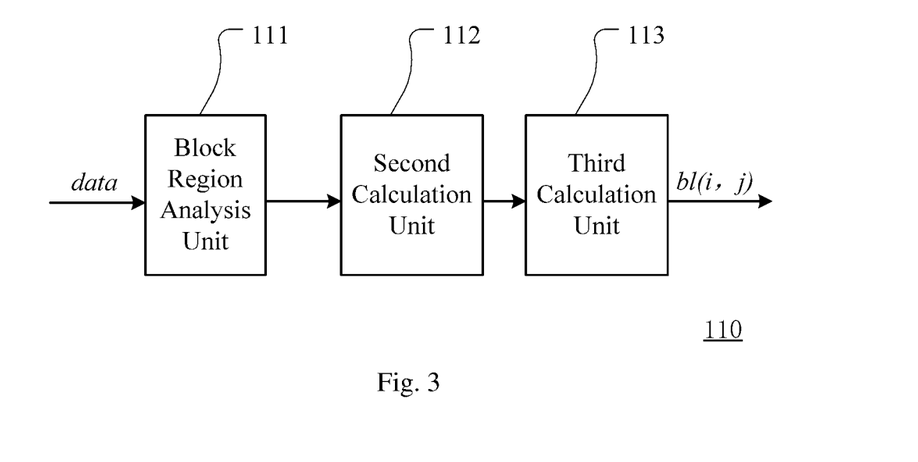
FIG. 3 shows a schematic structural diagram of a pixel brightness module in an apparatus for backlight control provided according to the present disclosure.

Further, FIG. 3 shows a schematic structural diagram of the pixel brightness module in the apparatus for backlight control provided according to the present disclosure. Referring to FIG. 3, the pixel brightness module 130 comprises a photographing unit 134, a sampling unit 131, a storage unit 132, and a first calculation unit 133. The photographing unit 134 is configured to obtain light diffusion data of the backlight source. The sampling unit 131 is connected to the photographing unit 134 and is configured to downsample the light diffusion data of the backlight source to generate downsampled data. The storage unit 132 is connected to the sampling unit 131 and is configured to store the downsampled data. The first calculation unit 133 is connected to the storage unit 132 and the filtering module 120, respectively, and is configured to upsample the stored downsampled data to generate upsampled data, and to perform convolution operation on the upsampled data with the adjusted brightness value ltf(i, j) of each backlight block of the backlight source to obtain the adjusted brightness value blpixel of the pixel in each backlight block. It should be noted that an ideal backlight dimming state diagram is obtained after the adjusted brightness value ltf(i, j) of each backlight block is obtained. However, since light emitted by the backlight source towards the display panel may be diffused, it is necessary to simulate real distribution of backlight, generated on the liquid crystal display panel by the backlight blocks in the backlight source, in the ideal light state diagram, so as to determine the adjusted brightness value blpixel of each pixel. Since a light diffusion function generated by a single backlight block is consistent with a resolution of the display panel, when the light diffusion function generated by the single backlight block is multiplied by the adjusted brightness value ltf(i, j) of the corresponding backlight block, it is necessary to perform a number (equal to the number of pixels in the display panel) of multiplications and then perform superposition on a number (equal to the number of the blacklight blocks) of high-resolution images. The above calculation has high requirements on calculation complexity capability of the pixel brightness module and the memory. The pixel brightness module 130 provided according to the present disclosure is improved on this basis. Further, when the real backlight distribution generated by a single backlight block is analyzed, and the light diffusion data thereof is only distributed in a limited region. Therefore, in this embodiment, a region Z1, with a neighborhood size of U*V units (each unit has a size of the backlight block), of the single backlight block is selected, and the pixel resolution of the region Z1 is U*zoneNum$_w$*V*zoneNum$_h$, where zoneNum$_w$*zoneNum$_h$ is the resolution of the backlight block. The sampling unit 131 is configured to downsample the region Z1 to obtain a region Z2, and the light diffusion data of the region Z2 is stored in the storage unit 132. Then, when the third calculation unit 133 calculates the adjusted brightness value blpixel of each pixel of the display panel in real time, it upsamples the region Z2 first to obtain a region Z3. Next, the adjusted brightness value blpixel of each pixel is calculated according to the light diffusion data of the region Z3. In this way, both the calculation complexity and a required memory size may be reduced to a realizable extent, and the obtained adjusted brightness value blpixel of each pixel is more accurate.

Figure 6:
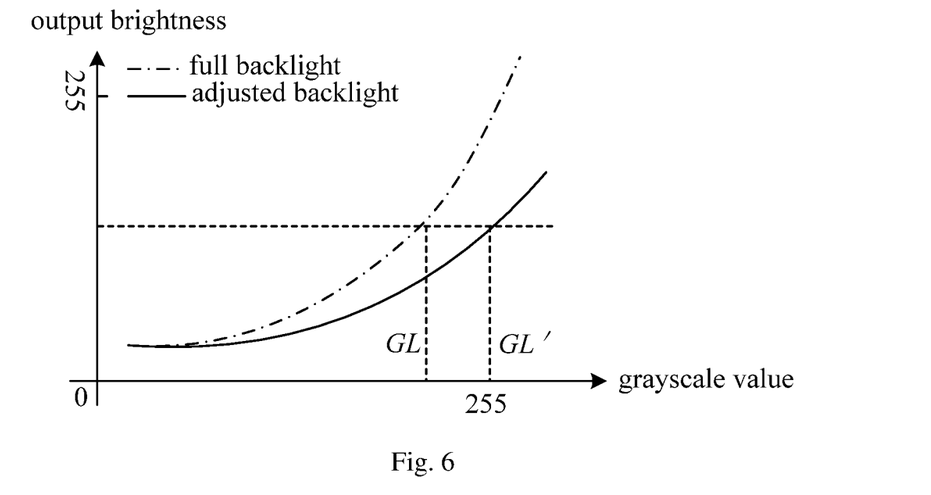
FIG. 6 shows a schematic waveform diagram of pixel grayscale compensation in the apparatus for backlight control provided according to the present disclosure.

Further, after the adjusted brightness value blpixel of each pixel on the display panel is obtained via the pixel brightness module 130, each pixel is subjected to grayscale compensation via the compensation module 250, to keep the display brightness of each pixel constant before and after performing local dimming and dynamic backlight processing. Specifically, FIG. 6 shows a schematic waveform diagram of pixel grayscale compensation in the apparatus for backlight control provided according to the present disclosure. Referring to FIG. 6, it is assumed that the adjusted backlight of the backlight source is reduced to 60% of a full backlight in brightness, and the pixel grayscale in the initial image data needs to be compensated from the grayscale value GL of the initial image data to a grayscale value GL' of the compensated image data, to keep the display brightness of the pixel unchanged after the backlight source is reduced in brightness. Herein, in this embodiment, taking an image with 8 bits as an example. Since the display brightness of the pixel remains constant before and after performing local dimming and dynamic backlight processing, following quantitative relationship may be established:

$$BLpixel \cdot \left(\frac{GL}{255}\right)^{\gamma} = blpixel \cdot \left(\frac{GL'}{255}\right)^{\gamma}.$$

Then a compensation coefficient $$\zeta = \min\left(\left(\frac{BLpixel}{blpixel}\right)^{\frac{1}{\gamma}}, \frac{255}{GL}\right)$$

of grayscale compensation is obtained, that is, GL'=GL·ζ, wherein linear compensation is used in the compensation module to obtain the compensated image data DATA. For RGB (red, green, and blue) images, grayscale values of three components of RGB of the pixel are simultaneously multiplied by the compensation coefficient ζ during the grayscale compensation, because after the three components RGB are multiplied by one coefficient ζ, chromaticity and color saturation remain unchanged, and only the brightness changes by ζ times.

Figure 4:
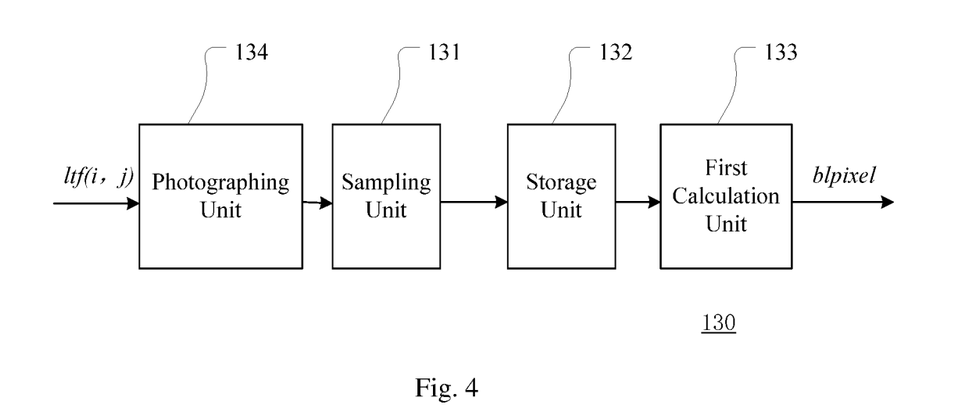
FIG. 4 shows a schematic structural diagram of a block brightness module in the apparatus for backlight control provided according to the present disclosure.

FIG. 4 shows a schematic structural diagram of the block brightness module in the apparatus for backlight control provided according to the present disclosure.

Referring to FIG. 4, an implementation of a block brightness mode in the first embodiment and/or the second embodiment is shown. The block brightness module 110 comprises a block region analysis unit 111, a second calculation unit 112, and a third calculation unit 113. The block region analysis unit 111 is configured to divide the initial image data (data) into a plurality of non-overlapped block regions corresponding to the backlight blocks of the backlight source. The second calculation unit 112 is configured to calculate a grayscale value of each pixel in each block region, to mark a maximum grayscale value $GL_{max}(i, j)$ of each block region, and to calculate a mean grayscale value $GL_{avg}(i, j)$ of each block region, wherein the grayscale value of each pixel is a maximum grayscale value of the grayscale values of subpixels in that pixel. The third calculation unit 113 is configured to obtain a grayscale value GL(i, j) of each block region on the basis of the maximum grayscale value $GL_{max}(i, j)$ of each block region, the mean grayscale value $GL_{avg}(i, j)$ of each block region, and a balance parameter k, and to obtain the initial brightness value bl(i, j) of the backlight block corresponding to each block region on the basis of the grayscale value GL(i, j) of each block region. Furthermore, the block region analysis unit 111 performs division, for example, uniform division, to obtain the plurality of block regions. The grayscale value GL (i, j)=k·$GL_{max}$ (i, j)+(1−k)·$GL_{avg}$(i,j) of each block region is obtained by the third calculation module 113. Herein, the balance parameter k is a value between 0 and 1, and the balance parameter k is generally close to 1, to prevent excessive overflow from occurring on pixels with high brightness after grayscale compensation. In this embodiment, the balance parameter k is, for example, 0.9. In other embodiments, the second calculation module 112 takes, for example, an average grayscale value of the subpixels of each pixel as the grayscale value of that pixel.

It should be noted that the modules and units described above maybe implemented by any one of hardware, firmware or software, or a combination thereof. For example, the modules and units can all be implemented by hardware, for example implemented by circuit. Or, in some embodiments, all the modules and units can be implemented by software as program modules or set of instructions. Therefore, the apparatus as a whole may be implemented as programs stored in a non-transitory memory. Or, in some embodiments, according to application scenarios, parts of the modules and units can be implemented by software and parts of the modules and units can be implemented by hardware or firmware. In that case, the apparatus as a whole may be implemented as a device with hardware (circuit) and storage medium.

Figure 7:
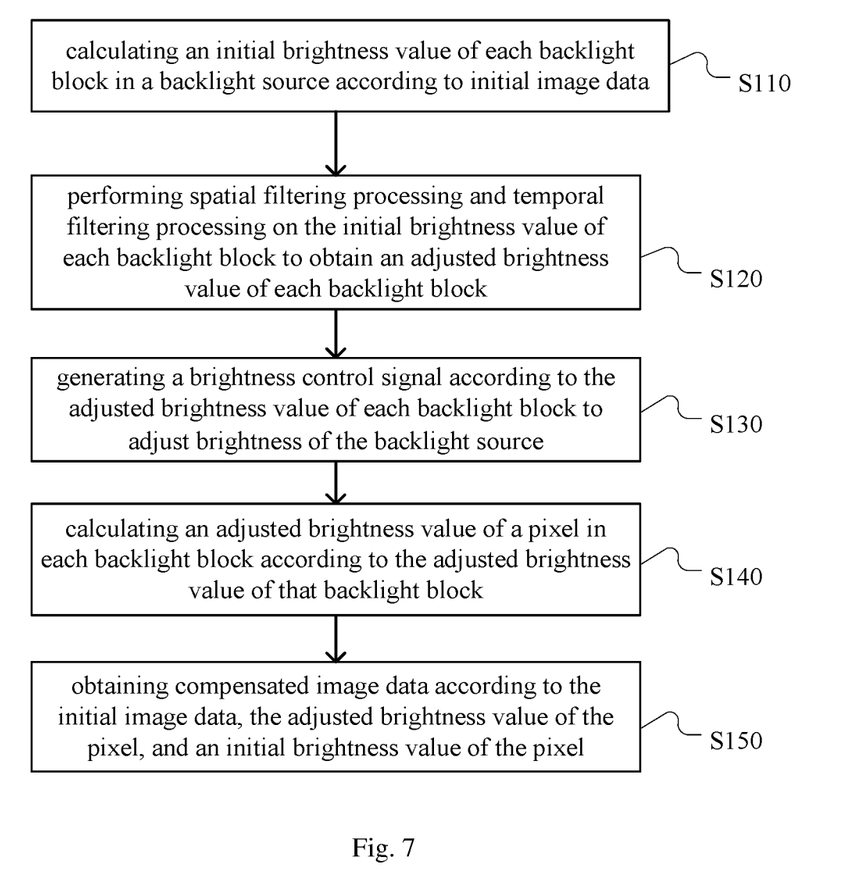
FIG. 7 shows a flowchart of a method for backlight control provided according to a third embodiment of the present disclosure.

FIG. 7 shows a flowchart of a method for backlight control provided according to a third embodiment of the present disclosure.

Referring to FIG. 7, the method for backlight control comprises following steps:

Step S110: calculating an initial brightness value of each backlight block in a backlight source according to initial image data. Further, the method comprises: dividing an initial image into a plurality of non-overlapped block regions corresponding to the backlight blocks of the backlight source, respectively; calculating a grayscale value of each pixel in each block region, marking a maximum grayscale value of each block region, and calculating an average grayscale value of each block region, wherein the grayscale value of each pixel is a maximum grayscale value of grayscale values of subpixels in that pixel; and obtaining a grayscale value of each block region according to the maximum grayscale value of each block region, the average grayscale value of each block region, and a balance parameter, and obtaining an initial brightness value of the backlight block corresponding to each block region according to the grayscale value of that block region.

Step S120: performing spatial filtering processing and temporal filtering processing on the initial brightness value of each backlight block to obtain an adjusted brightness value of each backlight block, wherein an intermediate brightness value of each backlight block obtained after the spatial filtering processing is performed on the initial brightness value of that backlight block is greater than or equal to the initial brightness value of that backlight block. Further, the step of performing spatial filtering processing on the initial brightness value of each backlight block comprises: performing Gaussian filtering processing on initial brightness values of backlight blocks positioned around that backlight block to obtain a filtered brightness value of that backlight block; and taking a larger one of the initial brightness value and the filtered brightness value of that backlight block as the intermediate brightness value of that backlight block. The step of performing temporal filtering processing on the initial brightness value of each backlight block comprises: obtaining the adjusted brightness value of that backlight block according to the intermediate brightness value of that backlight block in a current frame, the adjusted brightness value of that backlight block in a previous frame, and a smoothness parameter, wherein the smoothness parameter is related to a first threshold value, a second threshold value, and a mean absolute difference value of the intermediate brightness values of each backlight block in images of adjacent frames.

Step S130: generating a brightness control signal according to the adjusted brightness value of each backlight block, so as to adjust brightness of the backlight source.

Furthermore, the method, for example, comprises:

Step S140: calculating an adjusted brightness value of a pixel in each backlight block according to the adjusted brightness value of each backlight block. Further, the method comprises: obtaining light diffusion data of the backlight source; downsampling the light diffusion data to generate downsampled data; storing the downsampled data; and upsampling the stored downsampled data to generate upsampled data, and perform convolution operation on the upsampled data with the adjusted brightness value of each backlight block of the backlight source, so as to obtain the adjusted brightness value of a pixel in each backlight block.

Step S150: obtaining compensated image data according to the initial image data, the adjusted brightness value of the pixel, and an initial brightness value of the pixel, wherein the compensated image data matches with the adjusted brightness value of the pixel.

The present disclosure further provides a display device, at least comprising a display panel, a backlight source configured to provide a light source to the display panel, a backlight source drive circuit configured to drive the backlight source, and an apparatus for backlight control. Herein, specific implementation of the apparatus for backlight control may refer to the above description, which will not be repeated here. Herein, the display panel of the display device may be a liquid crystal module, and the backlight source is, for example, a direct type module. Further, the backlight source is, for example, integrated in the display panel.

It should be noted that the values herein are only used for illustrative description. In other embodiments of the present disclosure, other values may also be used for achieving this solution. Specifically reasonable setting should be made according to the actual situation, which is not limited by the present disclosure.

Finally, it should be noted that the above embodiments are only examples to clearly illustrate the present disclosure, rather than defining the embodiments. Those of ordinary skill in the art may also make other changes or variations in different forms on the basis of the above description. It is unnecessary and impossible to enumerate all embodiments here. The obvious changes or variations arising therefrom are still within the scope of protection of the present disclosure.

It should also be understood that the terms and expressions used herein are only used for description, and one or more embodiments of this specification should not be limited to these terms and expressions. The use of these terms and expressions does not mean the exclusion of equivalent features of any illustrations and descriptions (or part thereof). It should be recognized that various possible modifications should also be included in the scope of claims. Other modifications, changes and substitutions may also exist. Accordingly, the claims should be deemed to cover all these equivalents.

The invention claimed is:

1. An apparatus for backlight control, comprising:
   a block brightness module, configured to calculate an initial brightness value of each of backlight blocks in a backlight source according to initial image data, which corresponds to an initial image, wherein the initial image is divided into a plurality of block regions corresponding to the backlight blocks, respectively;
   a filtering module, connected to the block brightness module and configured to perform spatial filtering processing and temporal filtering processing on the initial brightness value of each of the backlight blocks to obtain an adjusted brightness value of each of the backlight blocks; and
   a control module, connected to the filtering module and configured to generate a brightness control signal according to the adjusted brightness value of each of the backlight blocks to control a backlight source drive circuit to adjust brightness of the backlight source,
   wherein an intermediate brightness value of each of the backlight blocks obtained after the filtering module performs the spatial filtering processing on the initial brightness value of that the backlight block is greater than or equal to the initial brightness value of that backlight block,
   wherein for each of the backlight blocks, the block brightness module is configured to obtain the initial brightness value of that backlight block according to a maximum grayscale value and an average grayscale value of grayscale values of pixels in the block region corresponding to that backlight block.

2. The apparatus for backlight control according to claim 1, wherein the filtering module comprises:
   a spatial filtering unit, configured to perform Gaussian filtering processing on the initial brightness values of backlight blocks positioned around each of the backlight blocks to obtain a filtered brightness value of that backlight block, and to take a larger one of the initial brightness value and the filtered brightness value of that backlight block as the intermediate brightness value of that backlight block.

3. The apparatus for backlight control according to claim 2, wherein the filtering module further comprises:
   a temporal filtering unit, configured to obtain the adjusted brightness value of each of the backlight blocks according to the intermediate brightness value of that backlight block in a current frame, the adjusted brightness value of that backlight block in a previous frame, and a smoothness parameter,
   wherein the smoothness parameter is related to a first threshold value, a second threshold value, and a mean absolute difference value of the intermediate brightness values of each of the backlight blocks in images of adjacent frames.

4. The apparatus for backlight control according to claim 1, further comprising:
   a pixel brightness module, connected to the filtering module and configured to calculate an adjusted brightness value of a pixel in each of the backlight blocks according to the adjusted brightness value of each of the backlight blocks; and
   a compensation module connected to the pixel brightness module and configured to obtain compensated image data according to the initial image data, the adjusted brightness value of the pixel, and an initial brightness value of the pixel, wherein the compensated image data matches with the adjusted brightness value of the pixel.

5. The apparatus for backlight control according to claim 4, wherein the pixel brightness module comprises:
   a photographing unit, configured to obtain light diffusion data of the backlight source;
   a sampling unit, configured to downsample the light diffusion data to generate downsampled data;
   a storage unit, connected to the sampling unit and configured to store the downsampled data; and
   a first calculation unit, connected to the storage unit and the filtering module, respectively, and configured to upsample the downsampled data being stored to generate upsampled data, and to perform convolution operation on the upsampled data with the adjusted brightness value of each of the backlight blocks of the backlight source, so as to obtain the adjusted brightness value of the pixel in each of the backlight blocks.

6. The apparatus for backlight control according to claim 1, wherein the block brightness module comprises:
   a block region analysis unit, configured to divide the initial image into thea plurality of non-overlapped block regions corresponding to the backlight blocks of the backlight source, respectively;
   a second calculation unit, configured to calculate a grayscale value of each pixel in each of the plurality of block regions, to mark a maximum grayscale value of each of the plurality of block regions, and to calculate an average grayscale value of each of the plurality of block regions, wherein the grayscale value of each pixel is a maximum grayscale value of subpixels in that pixel; and a third calculation unit, configured to obtain a grayscale value of each of the plurality of block regions according to the maximum grayscale value of each of the plurality of block regions, the average grayscale value of each of the plurality of block regions, and a balance parameter, and to obtain the initial brightness value of each of the backlight blocks corresponding to a corresponding one of the plurality of block regions according to the grayscale value of the corresponding one of the plurality of block regions.

7. A method for backlight control, comprising:

calculating an initial brightness value of each of the backlight blocks in a backlight source according to initial image data, which corresponds to an initial image, wherein the initial image is divided into a plurality of block regions corresponding to the backlight blocks, respectively;

performing spatial filtering processing and temporal filtering processing on the initial brightness value of each of the backlight blocks to obtain an adjusted brightness value of each of the backlight blocks; and generating a brightness control signal according to the adjusted brightness value of each of the backlight blocks, so as to adjust brightness of the backlight source, wherein an intermediate brightness value of each of the backlight blocks obtained after the spatial filtering processing is performed on the initial brightness value of that the backlight block is greater than or equal to the initial brightness value of that backlight block, wherein for each of the backlight blocks, the block brightness module is configured to obtain the initial brightness value of that backlight block according to a maximum grayscale value and an average grayscale value of grayscale values of pixels in the block region corresponding to that backlight block.

8. The method for backlight control according to claim 7, wherein step of performing spatial filtering processing on the initial brightness value of each of the backlight blocks comprises:

performing Gaussian filtering processing on the initial brightness values of backlight blocks positioned around each of the backlight blocks to obtain a filtered brightness value of that backlight block; and taking a larger one of the initial brightness value and the filtered brightness value of each of the backlight blocks as the intermediate brightness value of that backlight block.

9. The method for backlight control according to claim 8, wherein step of performing temporal filtering processing on the initial brightness value of each of the backlight blocks comprises:

obtaining the adjusted brightness value of that backlight block according to the intermediate brightness value of that backlight block in a current frame, the adjusted brightness value of that backlight block in a previous frame, and a smoothness parameter, wherein the smoothness parameter is related to a first threshold value, a second threshold value, and a mean absolute difference value of the intermediate brightness values of each of the backlight blocks in images of adjacent frames.

10. The method for backlight control according to claim 7, further comprising:

calculating an adjusted brightness value of a pixel in each of the backlight blocks according to the adjusted brightness value of each of the backlight blocks; and obtaining compensated image data according to the initial image data, the adjusted brightness value of the pixel, and an initial brightness value of the pixel, wherein the compensated image data matches with the adjusted brightness value of the pixel.

11. The method for backlight control according to claim 10, wherein step of calculating an adjusted brightness value of a pixel in each of the backlight blocks according to the adjusted brightness value of each of the backlight blocks comprises:

obtaining light diffusion data of the backlight source;

downsampling the light diffusion data to generate downsampled data;

storing the downsampled data; and upsampling the downsampled data being stored to generate upsampled data, and performing convolution operation on the upsampled data with the adjusted brightness value of each of the backlight blocks of the backlight source, so as to obtain the adjusted brightness value of the pixel in each of the backlight blocks.

12. A display device, comprising:

a display panel;

a backlight source, configured to provide a light source for the display panel;

a backlight source drive circuit, configured to drive the backlight source; and the apparatus for backlight control according to claim 1.

* * * * *